United States Patent [19]

Sturgeon

[11] 3,895,528

[45] July 22, 1975

[54] AIRCRAFT INSTRUMENTATION DISPLAYS
[75] Inventor: John Royal Sturgeon, Farnborough, England
[73] Assignee: The Secretary of State for Defence in her Britannic Majesty's Government of the United Kingdom of Great Britain and Northern Ireland, London, England
[22] Filed: Sept. 21, 1973
[21] Appl. No.: 399,524

[52] U.S. Cl. ............................. 73/178 R; 73/182
[51] Int. Cl. ............................................ G01c 21/10
[58] Field of Search........... 73/178 R, 182, 386, 387

[56] References Cited
UNITED STATES PATENTS
3,667,293  6/1972  Moore............................. 73/398 R
3,789,661  2/1974  Melsheimer ........................ 73/182

Primary Examiner—Donald O. Woodiel
Attorney, Agent, or Firm—Cameron, Kerkam, Sutton, Stowell & Stowell

[57] ABSTRACT

An aircraft instrumentation display comprises instruments one of which combines Pitot and Static pressures in a form which indicates aircraft total energy and can be used as an engine power director and one of which indicates pitot pressure and can be used as an elevator director. The two can be combined in the form in an XY plot on a Cathode Ray Tube.

Static Pressure is preferably obtained indirectly from a Base Pressure Tapping.

The signals used for driving the instruments can also be used as inputs to an aircraft autopilot.

5 Claims, 6 Drawing Figures

AIRCRAFT INSTRUMENTATION DISPLAYS

The present invention relates to aircraft instrumentation, and particularly to the pressure instruments.

Conventionally aircraft pressure instruments rely on two pressures, known as the pitot pressure and the static pressure.

The pitot pressure is the sum of the atmospheric pressure and the dynamic pressure due to motion of an aircraft through the atmosphere. It is usually measured using a probe with an orifice facing forwardly into the airstream, the probe being situated in a position where the airflow is unaffected by the aircraft itself. Typical positions are at the nose of the aircraft, underneath an aircraft wing, or projecting forward from a wing leading edge.

The static pressure is the atmospheric pressure at the point where an aircraft is flying and must be measured at a point on the aircraft where dynamic flow effects are minimal. Static pressure tappings therefore have apertures which lie parallel to the usual airflow, and are frequently positioned on the same probe as the pitot orifice.

Typical examples of aircraft pressure instruments are; the airspeed indicator, which subtracts the static from the pitot pressure, so giving the dynamic pressure which is proportional to the airspeed; the altimeter, which subjects an aneroid capsule to static pressure, movement of the capsule being calibrated to give a reading in terms of altitude; the vertical speed indicator which measures the rate of change of static pressure; and the machmeter, which in effect combines an airspeed indicator and an altimeter to provide a display calibrated in terms of Mach number.

Pitot and static tappings are frequently sited at some distance from the instruments they serve. There can, therefore, be quite appreciable time lags in the transmission of static pressure signals. It is also inherent in the design of static tappings that they should be very prone to transmit spurious readings when subjected to turbulence or sudden changes in aircraft attitude such as a pitch or sideslip.

Lag in instruments caused by, amongst other things, delay in transmission of static pressure changes, and incorrectly reading instruments, have caused, or have contributed to, accidents. For example, aircraft approaching to land under instrument flight rules have deviated from their flight path; and the first and subsequent deviations have been over-corrected until the aircraft have crashed. Pressure instruments can also be dangerously misleading in another flight condition, namely when an aircraft cruising at altitude encounters the phenomenon known as Clear Air Turbulence. Clear Air Turbulence occurs in conditions where there are no visual indications, such as cloud, of atmospheric disturbance, usually without any warning, and is characterised by very high wind shear gradients and vertical gusts. Clear Air Turbulence is particularly dangerous for large subsonic turbojet transport aircraft. Such aircraft are designed to sustain comparatively low loads, cruise at high altitude where the effects of time lags in static pressure systems are accentuated, cruise at a speed close to their maximum design speed, have pressure instruments sited a considerable distance from the pressure tappings, and are usually controlled by autopilot in cruising flight. Autopilots receive inputs from pressure tappings and the first effect on an aircraft encountering Clean Air Turbulence is frequently unlocking of its autopilot caused by changes in pressure signals greater than those allowed for in the autopilot design. Even without the complication of an autopilot unexpectedly unlocking the effect of Clear Air Turbulence, with its rapid and unpredictable changes of atmospheric conditions, on pressure instruments is to present to aircrew a display which, due to time lags in the static pressure system and spurious static pressure readings caused by turbulence, gives an unreliable indication of the aircraft's condition. In such circumstances the reactions of aircrew to the information provided by the pressure instruments frequently aggravates rather than improves the aircraft's flight condition, and design loads and airspeed may well be exceeded, possibly with disastrous consequences.

According to the present invention an aircraft instrumentation display system having a source of pitot pressure and a source of static pressure includes; means for combining the pitot and static pressures to provide a signal, representative of aircraft total energy, for use as an engine power director; and means for converting the pitot pressure into a signal for use as an elevator director.

A preferred form of engine power director displays the function $P - nS$ where $P$ is the pitot pressure, $S$ is the static pressure and $n$ is a constant and has a value of 2, or very nearly 2. Provided that the value $P - nS$ is kept constant the aircraft total energy remains substantially constant. Preferably an engine power director obtains its static pressure signal indirectly from a suitable base pressure tapping (the base pressure $B$ is the pressure at a flat rearward facing surface on an aircraft and is related to the pitot and static pressures by the formula $B = S - k(P - S)$ where $k$ is substantially constant up to high subsonic speeds).

In one type of elevator director, for use in cruising flight, pilot pressure is displayed directly to the pitot. In another type of elevator director, for use in climb or descent, pitot pressure is supplied to a vertical speed indicator type of instrument.

A convenient instrument displays total aircraft energy and pitot pressure on the one instrument in the form of an XY display of $P - nS$ against $P$, so providing a single flight director instrument. Permitted operating regimes of the aircraft, or conventional height and speed scale markings can be incorporated in the background of the display. A cathode ray tube is a suitable instrument for such a display.

In another form of the invention an aircraft autopilot receives pressure signals corresponding to the signals supplied to the engine power and elevator directors.

Signals to the autopilot can be direct from the pressure tappings.

Some instruments according to the invention will now be described, by way of example only, with reference to the accompanying diagrammatic drawings, of which;

Figure 1:
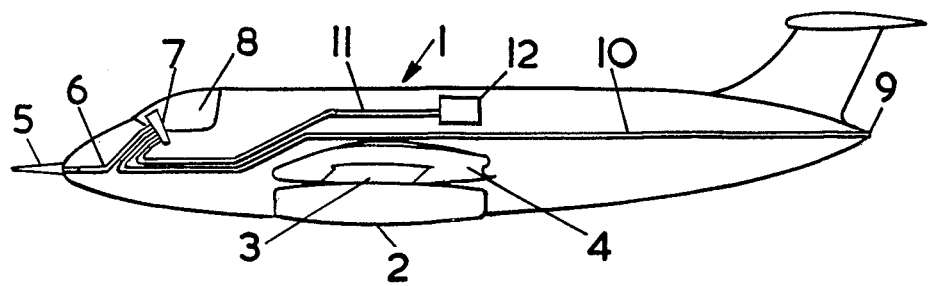
FIG. 1 shows an aircraft with pitot and base pressure tappings.

An aircraft 1 (FIG. 1) has engines mounted on pods under wings such as those shown at 2, 3, 4 respectively. A probe 5 for sensing pitot pressure is connected by tubing 6 to instruments on an instrument panel 7 in the aircraft cockpit 8.

A base pressure tapping 9 situated, for example, at the rear of the fuselage is also connected by tubing 10 to instruments on the panel 7. Pressure signals are also transmitted by piping 11 to an autopilot 12.

Figure 2:
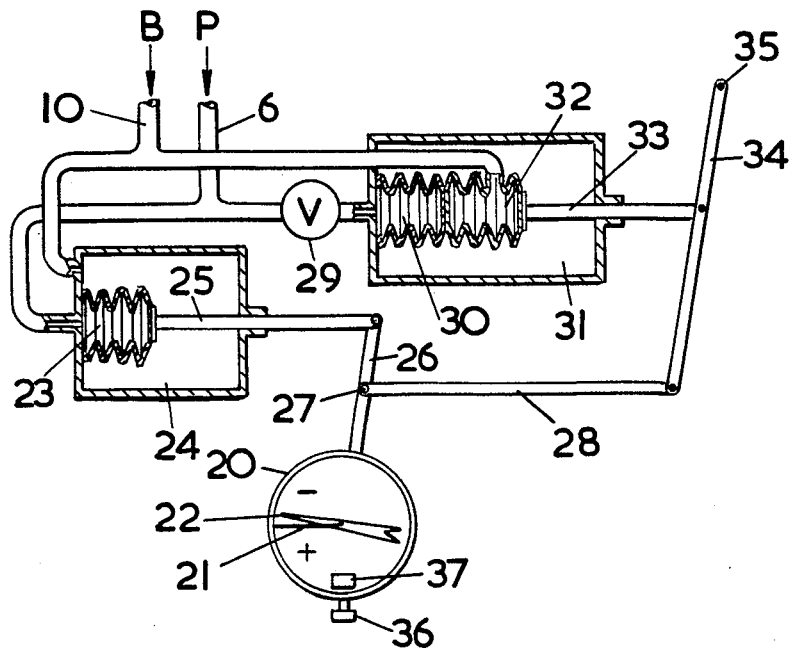
FIG. 2 shows an engine power director.

An engine power director (FIG. 2) has a meter 20 with a datum line 21 and a pointer 22. The pointer is controlled according to the value $P - 2S$, the value of $S$ being derived from the base pressure $B$ obtained from the tapping 9.

$$B = S - k(P - S) \quad \ldots(i)$$

$$\text{therefore} \quad S = \frac{B + kP}{1 + k} \quad (ii)$$

$$\text{therefore} \quad P - 2S = P - 2\left\{\frac{B + kP}{1 + k}\right\} \quad (iii)$$

$$= \frac{P - B}{1 + k} - \frac{kP + B}{1 + k} \quad (iv)$$

Pitot pressure $P$ from tubing 6 is fed to a capsule 23 contained in a chamber 24 connected to tubing 10 and hence to base pressure $B$. The capsule 23 is expansible, and expands or contracts according to the pressure $P - B$.

A rod 25 movable with capsule 23 actuates a lever arm 26 which is pivoted about a pivot 27 on one end of an arm 28. Pitot pressure $P$ is also fed via a reducing valve 29 where it is reduced to $kP$ to a capsule 30 contained in a chamber 31. Mounted on the capsule 30 is a capsule 32 which is connected to tubing 10 and hence base pressure $B$. The pressure in the chamber 31 is maintained at a fixed datum level and the capsules 30 and 32 are expansible. The total movement of capsules 30, 32 depends on the pressure $kP + B$.

A rod 33 movable according to the sum of the movements of capsules 30 and 32 actuates a lever arm 34 which is pivoted at one end about a fixed pivot 35 and which carries at its other end the second end of the arm 28. The movement of lever arm 26 is therefore controlled according to the value $(P - B) - (kP + B)$.

The lever arm 26 is connected so as to control movement of the pointer 22, the connection being such as to compensate for the factor $(1 + k)$ contained in Equation (iv) above.

At various stages of flight it will be required to fly at different total energy levels. The required level can be selected using a control knob 36 and the selected level displayed in a panel 37.

Another way of expressing Equation (iv) is:

$$P - 2S = P\frac{(1 - k)}{1 + k} - B\frac{2}{1 + k}$$

An instrument designed according to this formula would need two pressure capsules, with the $k$ factor being removed by mechanical linkages. Practically such an instrument would be simpler to construct than the one described.

It is also worth noting that if a site can be found for measuring base pressure where $k = 1$, Equation (iv) reduces to:

$$P - 2S = -B$$

so giving an extremely simple engine demand instrument.

Figure 3:
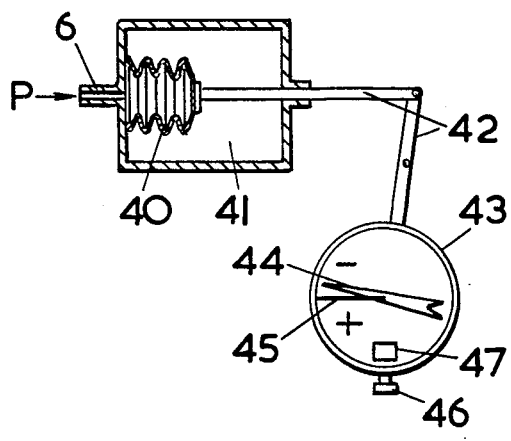
FIG. 3 shows an elevator director for cruising flight.

An elevator director for level flight (FIG. 3) has a capsule 40, supplied by pitot pressure $P$ through tubing 6, in a chamber 41 at a fixed datum pressure. Movement of the capsule 40 caused by changes in pitot pressure $P$ are communicated via levers 42 to an elevator demand meter 43 having a datum line 44 and a pointer 45. A required dynamic pressure can be selected using a selector knob 40 and the selected pressure displayed in a panel 47.

Figure 4:
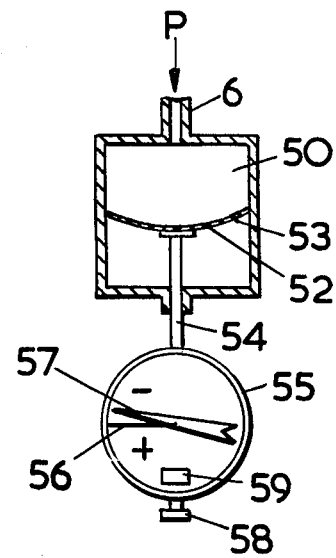
FIG. 4 shows an elevator director for use in climb and descent.

An elevator director for climbing or descending flight (FIG. 4) has a chamber 50 supplied by pitot pressure $P$ from tubing 6. A flexible diaphragm 52 having a calibrated orifice 53 is connected by a lever 54 to an elevator demand meter 55 having a datum line 56 and pointer 57. A required pressure change level can be selected using selector knob 58 and the selected level displayed in a panel 59.

It will be appreciated that instruments such as Air Speed Indicator, Machmeter and Altimeter will still be required for navigational and Air Traffic Control requirements. However instruments according to the invention will greatly reduce the load on the pilot during critical flight phases.

It should also be understood that the instruments described above are greatly simplified and are described merely to indicate ways in which the principle of the invention can be put into practice.

Figure 6:
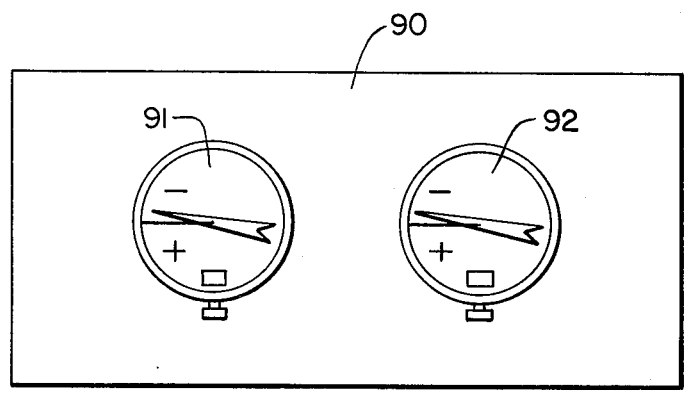
FIG. 6 shows a pilot display comprising an engine power director and an elevator director.

A typical pilot display (FIG. 6) might comprise a panel 90 situated on the pilot's instrument panel 7 (FIG. 1). On the panel 90 are mounted an engine power director 91, similar to the meter 20 illustrated in FIG. 2, and an elevator director 92, which may be similar either to the meter 43 illustrated in FIG. 3 (for use in steady flight) or to the meter 55 illustrated in FIG. 4 (for use in ascending or descending flight).

Figure 5:
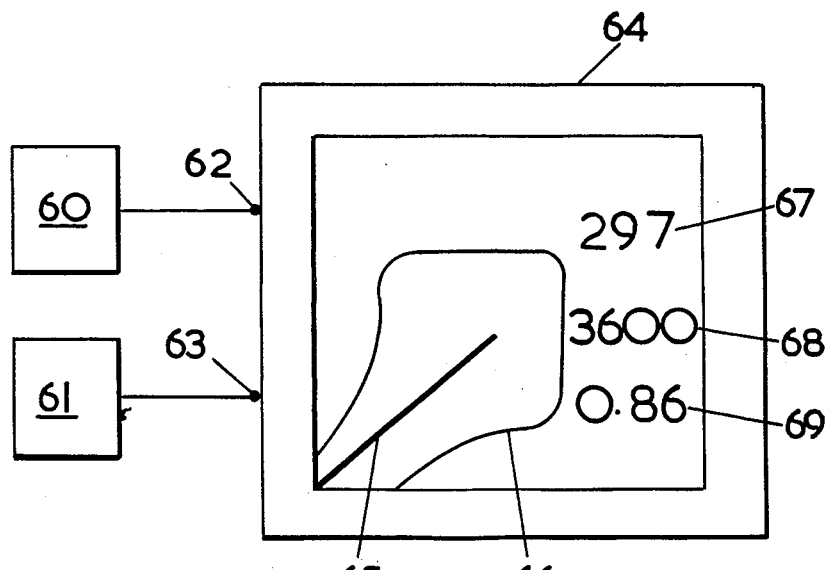
FIG. 5 shows a cathode ray display providing flight director control.

The signals from the elevator and engine power directors can be converted to electrical signals which can be fed directly or via a computer to a cathode ray tube, as indicated in FIG. 5. Electrical signals from an engine power director 60 and an elevator director 61 are passed to inputs 62, 63 respectively of a cathode ray tube display unit 64, and represented as an XY plot of $P - nS$ against $P$, 65. A permitted operating regime of the aircraft can be superimposed on the background as indicated at 66. Conventional instrument readings can also be superimposed, in digital form if desired, as indicated at 67 representing airspeed, 68 representing altitude, and 69 representing Mach number.

In aircraft equipped with instrumentation display systems as described above and also having autopilots, the autopilots preferably receive, and are programmed to respond to, signals as used in the display system.

What I claim is:

1. An aircraft instrumentation display system having a source of pitot pressure and a source of static pressure comprising; means for combining the pitot and static pressures to provide a signal, representative of aircraft total energy, for use as an engine power director; a first instrument displaying said total energy signal; means for converting pitot pressure into a signal for use as an elevator director; and a second instrument displaying said pitot pressure signal, both of said instruments being mounted upon a common panel visible to the pilot of the aircraft.

2. An aircraft instrumentation display system as claimed in claim 1 including means for deriving the signal representative of aircraft total energy from a combination of the pitot and static pressures according to the formula $P - nS$ where P is the pitot pressure, S is the static pressure and n is a constant whose value is substantially 2.

3. An aircraft instrumentation display system as claimed in claim 2 including a base pressure tapping from which the static pressure is obtained indirectly.

4. An aircraft instrumentation display system having a source of pitot pressure and a source of static pressure comprising; means for combining the pitot and static pressures to provide a signal, representative of aircraft total energy, for use as an engine power director; means for converting pitot pressure into a signal for use as an elevator director; means for deriving the signal representative of aircraft total energy from a combination of the pitot and static pressures according to the formula $P - nS$ where p is the pitot pressure, S is the static pressure and n is a constant whose value is substantially 2, a Cathode Ray Tube visible to the pilot, and means for displaying on said Cathode Ray Tube said total energy signal and said pitot pressure signal, the display being in the form of an XY plot of $P - nS$ against P.

5. An aircraft instrumentation display system as claimed in claim 4 including a base pressure tapping from which the static pressure is obtained indirectly.

* * * * *

UNITED STATES PATENT OFFICE
CERTIFICATE OF CORRECTION

PATENT NO. : 3,895,528
DATED : July 22, 1975
INVENTOR(S) : John Royal Sturgeon

It is certified that error appears in the above-identified patent and that said Letters Patent are hereby corrected as shown below:

Cover page, after item [21], insert:
--[30] Foreign Application Priority Data
   September 22, 1972  Great Britain 43895/72--.
Column 6, line 8, "p" should read --P--.

Signed and Sealed this thirtieth Day of September 1975

[SEAL]

Attest:

RUTH C. MASON
Attesting Officer

C. MARSHALL DANN
Commissioner of Patents and Trademarks